J. JONES & A. PHARISS.
Brake for Harvesters.

No. 226,451.   Patented April 13, 1880.

UNITED STATES PATENT OFFICE.

JOHN JONES AND ALBERT PHARISS, OF LAKEVILLE, CALIFORNIA.

BRAKE FOR HARVESTERS.

SPECIFICATION forming part of Letters Patent No. 226,451, dated April 13, 1880.

Application filed June 25, 1879.

*To all whom it may concern:*

Be it known that we, JOHN JONES and ALBERT PHARISS, of Lakeville, county of Sonoma, and State of California, have invented a Brake for Harvesters and Headers; and we hereby declare the following to be a full, clear, and exact description thereof.

Our invention relates to an improvement in harvesters and headers; and our improvements consist in providing brakes for the wheels of these implements, by which their movement can be regulated in going down hill, said brakes being operated by a rod leading to a convenient point on the machine, where it may be handled by the driver.

In ordinary headers the wheels are made with flanges or corrugations formed transversely on the tires in order to give said wheels tractive force. It is therefore impossible to apply brakes to the wheels, since the transverse flanges or corrugations catch on the brake-shoes. It nevertheless frequently happens that in hilly land accidents occur from harvesters or headers being unprovided with brakes, and the horses being unable to control the downward movement, as these implements are quite heavy, such occurrences are dangerous to the animals and destructive to the machines.

Figure 1:
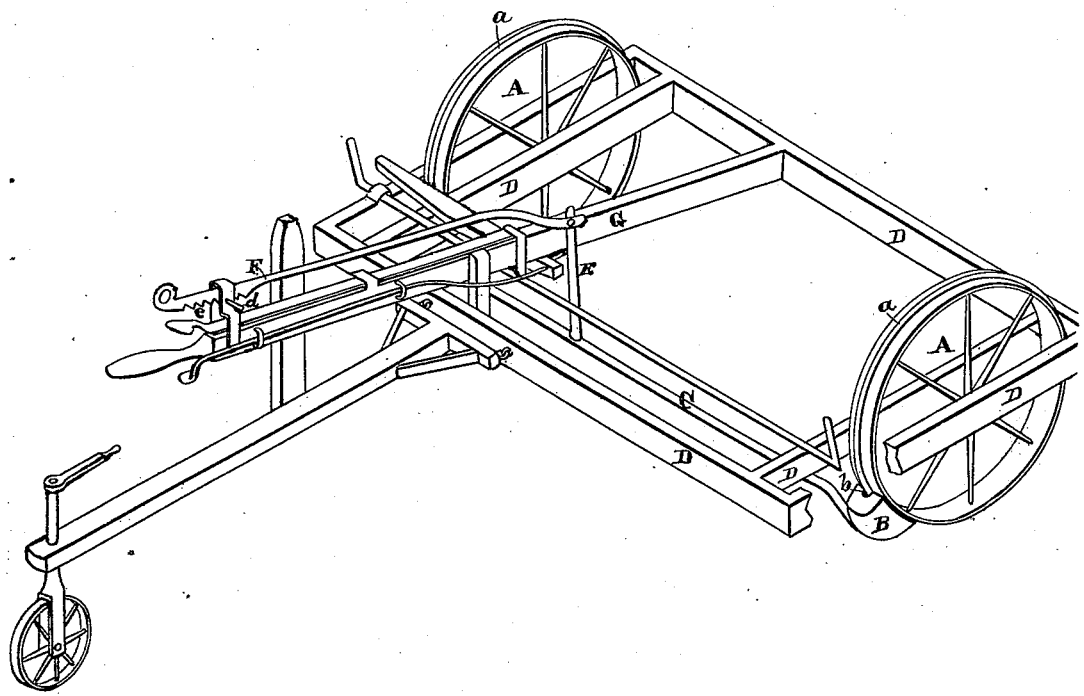
Figure 2:
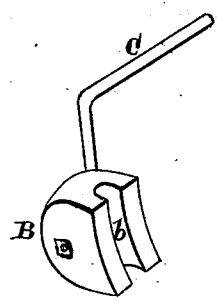

Figure 1 is a perspective view. Fig. 2 is a view of the brake.

In making the ground-wheels for our headers we dispense with the transverse flanges or ribs, since we find, in practice, that they are unnecessary to give tractive force, the weight of the implement being sufficiently great to prevent the wheels slipping. On these wheels A we provide a centrally-placed flange, *a*, which encircles the tire and prevents any lateral motion or sliding in a rough or side-hill country, and which, being in the line of motion of the wheel, offers no obstruction to the brake-blocks B. These brake blocks or shoes B are hung on a brake-bar, C, under the frame D of the header, and have longitudinal slots *b* cut in them, into which the flange *a* may fit as the wheel revolves, so that the face of the shoe will set firmly against the tire when desired.

On the brake-bar is the lever-rod E and hand-rod F, for moving the brake-bar. The hand-rod F extends up to the outer end of the elevating-bar G of the header, and notches *c* are cut in it, which engage with a pin, *d*, on a hasp on the bar G, so as to control the movement of the brake-bar at any desired point. The brake-handle is then close to the operating-rods for the adjustable reel and shifting-lever for the knife, as shown. As the hand-bar F is pivoted or hinged on the top of the lever E, the movement of the elevating-bar G of the header does not affect the action of the brake in any way.

In the Pacific coast regions of the United States, where very large tracts of land are cultivated, the header is used to a great extent. In the foot-hills there is considerable rolling land, upon which it is found difficult to operate a header by reason of its liability to get out of the control of the horses in going down hill, and in such places a brake is an absolute necessity. The comparatively great weight of the implement will give the ground-wheels sufficient tractive force to operate the cutting knives and mechanism without the use of transverse flanges on the wheel-tires.

We propose, also, to apply this brake to harvesters, which are moved about from place to place, and which are quite heavy. As these harvesters are not usually supplied with brakes they are difficult to control in going down hill, and the wheels have to be locked with ropes or chains in such cases. This difficulty will be obviated by the application of a brake, as herein described.

Having thus described our invention, what we claim as new, and desire to secure by Letters Patent, is—

The combination, with a header or harvester mounted on wheels A A, having exterior flanges, *a a*, of the brake-bar C, arranged under the header-frame and provided with brake-shoes B B, having longitudinal slots or grooves *b b*, the lever E, and hand-bar F, pivoted or hinged on the top of the lever E, and extending forward and connected with the header-bar G, substantially as and for the purpose herein shown and described.

In witness whereof we have hereunto set our hands.

JOHN JONES.
ALBERT PHARISS.

Witnesses:
THOS. J. GEARY,
GEO. HOODS.